United States Patent [19]
Krysiak

[11] 3,814,206
[45] June 4, 1974

[54] AIR GENERATING MECHANISM FOR AN AIRCRAFT AIR CUSHION TAKEOFF AND LANDING SYSTEM

[76] Inventor: Joseph E. Krysiak, 510 Wilmington Ave., Dayton, Ohio 45420

[22] Filed: Mar. 7, 1973

[21] Appl. No.: 338,728

[52] U.S. Cl. ............................... 180/116, 60/26.11
[51] Int. Cl. ............................................. B60v 1/00
[58] Field of Search .......... 180/116, 124; 60/26.11, 60/39.47, 26.1, 250

[56] References Cited
UNITED STATES PATENTS

| | | | |
|---|---|---|---|
| 2,922,050 | 1/1960 | Loughran | 60/39.47 |
| 3,078,948 | 2/1963 | Rolle | 180/116 X |
| 3,210,930 | 10/1965 | Leeper | 60/250 X |
| 3,210,931 | 10/1965 | Elnufon | 60/250 X |
| 3,266,251 | 8/1966 | Kacek | 60/39.47 |
| 3,302,568 | 2/1967 | Biehl | 60/250 X |
| 3,328,962 | 7/1967 | De Feo | 60/26.11 X |
| 3,433,014 | 3/1969 | Duport | 60/26.11 X |
| 3,460,349 | 8/1969 | Biehl | 60/228 |
| 3,690,401 | 9/1972 | Earl | 180/124 |

Primary Examiner—David Schonberg
Assistant Examiner—T. Siemens
Attorney, Agent, or Firm—Harry A. Herbert, Jr.; Arthur R. Parker

[57] ABSTRACT

Air cushion-producing apparatus mounted within an aircraft and including an air inlet duct terminating in an open bottom portion with a drive fan positioned therewithin, a turbine interconnected with the fan through a common, rotatable supporting shaft, an inflatable air cushion-bag having its interior communicating with the open bottom portion and air inlet duct and suspended from, and providing the sole support to the aircraft during takeoff and landing, and a series of propellant-nozzle cartridges mounted for successive adjustment to a firing position, relative to the turbine, and ignitable to develop an impulse-producing thrust against, and thereby driving the turbine and its associated fan to pump an inflation-producing air flow into the air cushion-bag.

There is reserved to the Government of the United States a nonexclusive, irrevocable, royalty-free license in the invention described herein with power to grant licenses for all governmental purposes.

10 Claims, 21 Drawing Figures

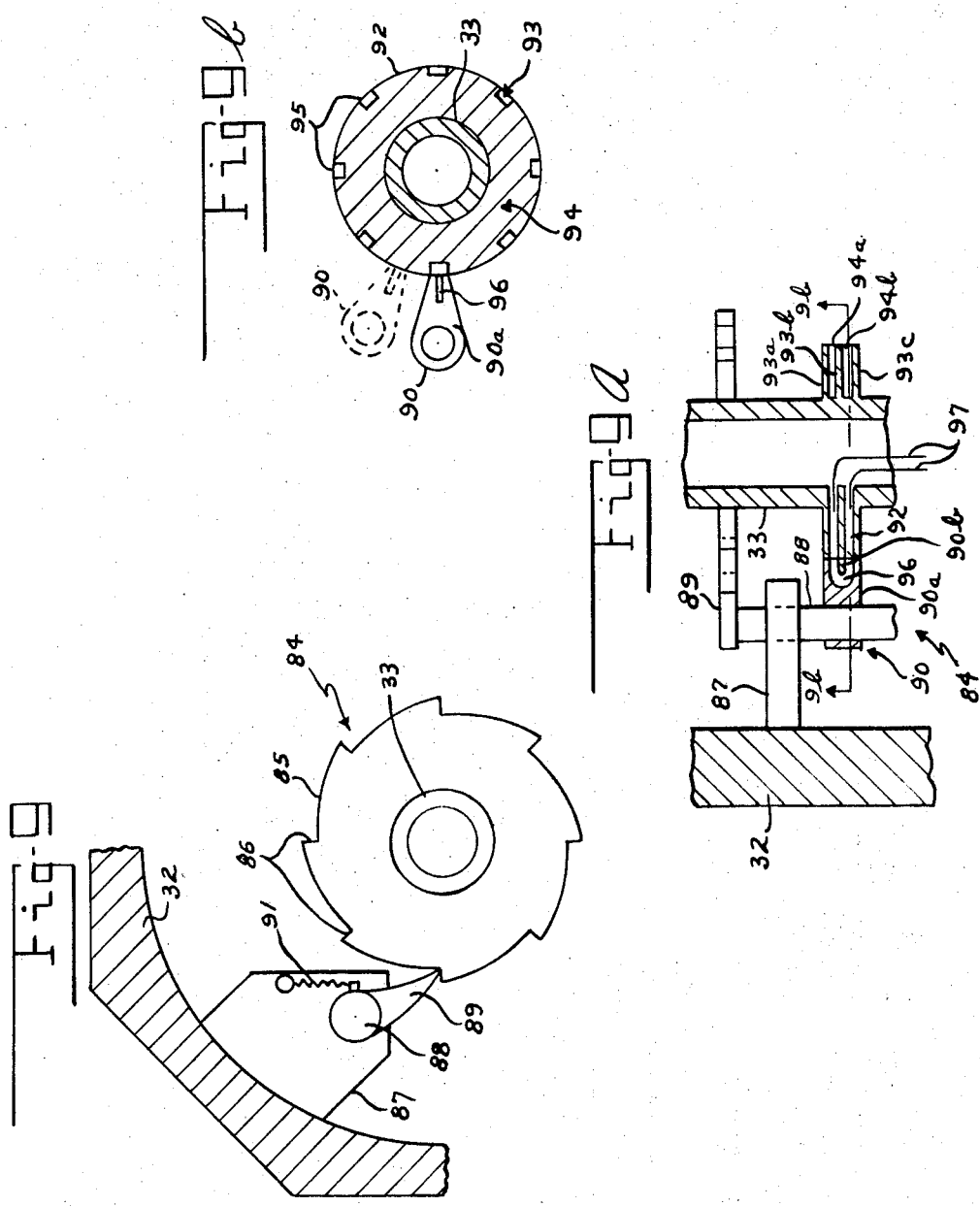

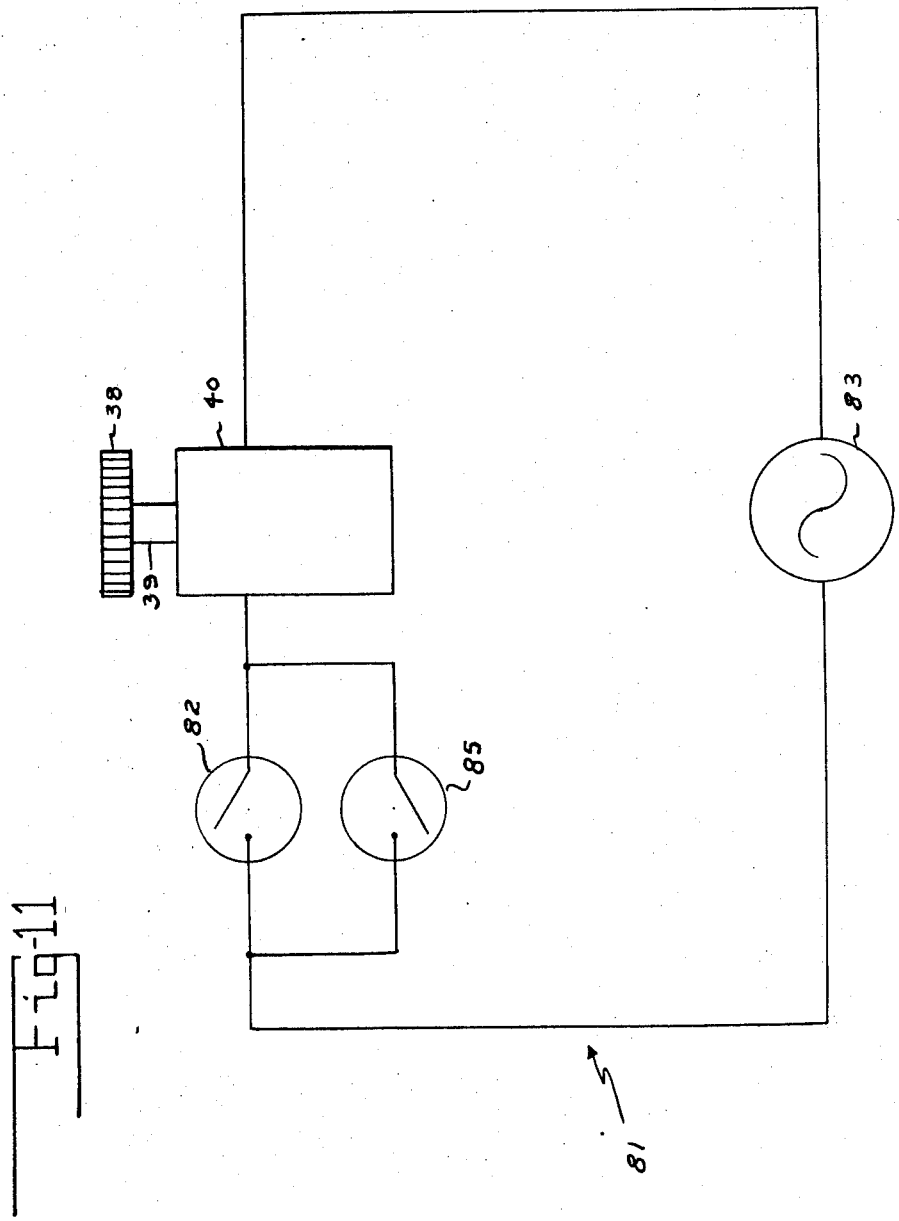

AIR GENERATING MECHANISM FOR AN AIRCRAFT AIR CUSHION TAKEOFF AND LANDING SYSTEM

BACKGROUND OF THE INVENTION

This invention relates generally to air cushion vehicles and, in particular, to an improved means for generating the air flow used for producing the air cushion beneath such vehicles.

Except for the present invention, current and projected future applications of the air cushion principle visualize the use of rather orthodox and relatively large types of air moving mechanisms such as, for example, conventional drive motors, compressors, transmissions and fans as the prime movers for supplying the air that forms the requisite air cushion beneath the particular vehicle during takeoff and landing operations. In one development, a test aircraft has been flown that is equipped with a depending and inflatable air cushion-bag that provides the entire support and acts in place of conventional landing gear structure during takeoff and landing. Although preliminary tests have confirmed the apparent feasibility of using the aforementioned relatively large types of mechanisms to produce the air being utilized as the air cushion means; nevertheless, it is clear that such devices inherently suffer from the intrinsic disadvantages of excessive weight and size. Moreover, a major structural modification of existing aircraft would be required to house these relatively large-types of mechanisms if the structural integrity of the aircraft is to be maintained. In addition, the power required for operating these previously-conceived relatively large air generating mechanisms would further necessitate the expenditure of relatively large amounts of fuel, adding considerably to the overall non-payload fuel weight to be carried by the aircraft, while, at the same time, causing a significant reduction in range. Finally, the positioning of such larger-types of air drive mechanisms within the aircraft would also result in extremely difficult maintenance problems and, moreover, would require additional and a relatively large amount of armor plate for their protection in vehicles to be used in combat operations. Otherwise, their extreme vulnerability to ground fire, for example, would be self-evident. It is considered obvious, therefore, that any benefits which might otherwise be derived from the use of such currently-proposed air generating mechanisms would be far outweighed by their built-in disadvantages, as outlined hereinabove.

On the other hand, the new and improved air generating mechanism of the present invention solves or, at least substantially alleviates the foregoing problems of the presently-conceived, relatively large types of mechanisms by proposing an air generating mechanism that is both novel, of a reduced weight, more compact, and yet is relatively simple and effective in producing the required air cushion in the unique manner to be clearly set forth hereinafter in the following summary and detailed description thereof.

SUMMARY OF THE INVENTION

The present invention consists briefly in a unique air generating mechanism that combines, in a novel manner, a turbine-drive fan assembly consisting of a high temperature gas turbine wheel and an axial flow drive fan mounted on opposite ends of a common, rotatable shaft and enclosed within a housing structure, with a high energy package assembly consisting of a combined solid rocket propellant and nozzle assembly, and a uniquely-applied indexing mechanism. The propellant and nozzle assembly actually consists of a series of separate high energy propellant and nozzle packages which may be referred to as cartridges and which are mounted together for rotation about a common axis. The indexing mechanism is uniquely assembled to the propellant and nozzle assembly, and is electrically operable, for example, by the pilot of the aircraft in which mounted, to bring each of the separate propellant and nozzle packages or cartridges, in successive order and when the propellant of the next preceeding package or cartridge has been exhausted, into a firing position relative to the turbine wheel of the combined turbine-drive fan assembly.

Ignition of the propellant in the particular propellant and nozzle package or cartridge, previously located in firing position by the indexing mechanism, results in a thrust directed by the nozzle portion and producing an impulse directly against the turbine wheel and which, in one application thereof, may last for some twenty minutes. When in the correct firing position, this impulse is directed against the wheel of the turbine to drive both it and the associated drive fan and, in this manner, automatically effect the pumping of outside air by the drive fan through a main air inlet and duct, and communicating open bottom portion incorporated in the housing into an inflatable bag mounted in depending relation on the housing and forming the requisite air cushion.

The aforementioned indexing mechanism is part of a novel overall indexing turret assembly that may be releasably mounted to the solid rocket propellant and nozzle assembly, and which may also incorporate a relatively large internal spur gear that is designed to mesh with a relatively small spur gear driven by an electrical motor controlled by the aircraft pilot, for example. In addition, an electrical firing circuit is used to ignite a primer that, in turn, fires the main solid propellant of the respective propellant and nozzle package or cartridge. The previously-referred to electrical motor is operative to adjust the indexing turret assembly, in rotation, to bring a respective propellant and nozzle package or cartridge in its correct firing position relative to the turbine wheel, as previously noted. The indexing mechanism is operative incrementally to automatically lock the turret assembly so that the particular propellant and nozzle package is positively held in the correct firing position. In addition, this operation of the indexing mechanism also operates an electrical circuit disconnector to thereby automatically shut off the electrical motor at the proper time, namely, when the particular propellant-nozzle package has been rotated to the firing position.

The above-referred to electrical firing circuit incorporates a firing device that is arranged so as to be always aligned with the primer of each propellant and nozzle assembly as the turret assembly is indexed by the indexing mechanism into the said firing position.

Other unique features, objects and advantages of this invention will appear hereinbelow in the following disclosure, taken in connection with the accompanying drawings, in which:

BRIEF DESCRIPTION OF THE DRAWINGS

FIG. 9 is an additional, relatively enlarged, partly sectional and broken-away view, showing details of a unique indexing mechanism used with, and as part of the invention;

FIG. 9a is another relatively enlarged, partly sectional and broken-away view, in side elevation, disclosing further details generally of the indexing mechanism of FIG. 9 and, in particular, of the novel gear motor-electrical circuit disconnector thereof;

FIG. 9b is a cross-sectional view, taken about on line 9b—9b of FIG. 9a and illustrating other details of the gear motor-electrical circuit disconnector;

FIGS. 10b and 10c respectively represent relatively enlarged, fragmentary views of the primer, firing cap or igniter subassembly used with the high energy package of FIGS. 10 and 10a; and FIG. 11 represents a schematic of an electrical circuit that may be used by the aircraft pilot to automatically operate a gear motor for adjusting a respective high energy package to a firing position relative to the turbine-drive fan assembly.

DESCRIPTION OF THE PREFERRED EMBODIMENT

Figure 1:
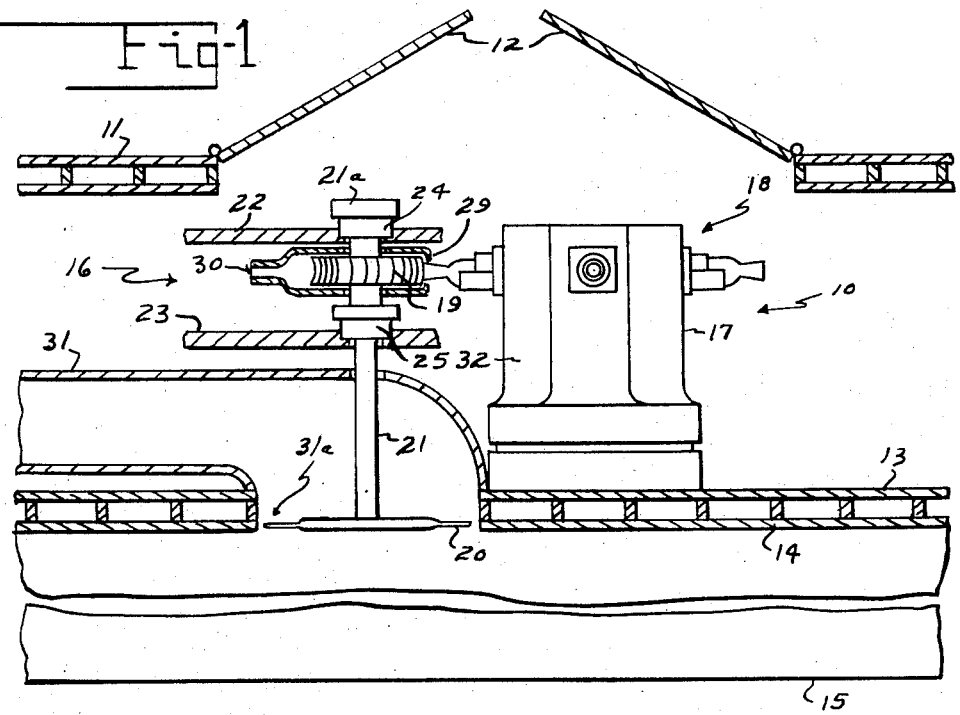
FIG. 1 represents an overall assembly and schematic view, in longitudinal section and partly broken-away, illustrating the new and improved air generating mechanism of the present invention installed in a portion of an appropriate-type aircraft.

Referring generally to the drawings and, in particular to FIG. 1, the new and improved air generating mechanism of the present invention is indicated generally at 10 as being installed in an appropriate aircraft, beneath the aircraft cabin floor, indicated generally at 11, that has been equipped with a set of access doors 12. Air generating mechanism 10 may be generally supported by, and in a substantially vertical, upright relation on the aircraft fuselage supporting structure 13, with the fuselage exterior or bottom surface being indicated at 14. In this example, an air cushion is provided directly beneath the exterior 14 of the fuselage supporting structure 13 by means of the use of an inflatable bag, indicated in part in schematic and broken-away form at 15, that may be suspended in an appropriate manner, in depending relation therefrom. Further details of the inflatable bag 15, and its actual support to the bottom of the fuselage are not herein described, since they are unimportant to the present invention. It is sufficient to state that the interior of the inflatable air cushion-bag 15 is open communication with and thereby receives an air flow from the open and downwardly-directed exit portion 31a of a main air inlet duct, indicated generally and in partly broken-away form at the reference numeral 31. The duct 31, of course, incorporates a main air inlet (not shown) at its upstream end. Naturally, the requisite air cushion is formed, in this instance, partially from the inflated bag 15, and in the main from the flow of air through appropriately-located perforations in the bag, which air is specifically directed thereby to form an air cushion with the aircraft, through the continuous introduction of an air flow into, and through the bag 15 from the aforesaid air duct 31 in a unique manner and by the new and improved means to be set forth hereinafter in detail and constituting the present invention.

Figure 5:
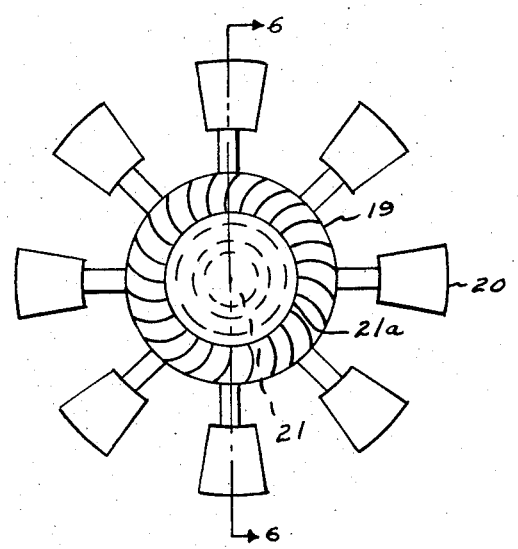
FIG. 5 is a further relatively enlarged, top view, more clearly illustrating details of the turbine or rotor-fan assembly of the invention.

The above-referred to introduction of a continuous supply of air or air flow into the bag 15 to form the necessary air cushion by the combined action of the bag is effected by means of the operation of what is preferably, but not necessarily limited to, an axial flow rotor drive fan 20 (Note FIG. 1) that may be positioned directly within the communicating exit opening 31a between the air inlet duct 31 and the interior of the said inflatable air cushion-bag 15, as shown. Said drive fan 20 forms an integral and important part of a combined turbine and rotor drive fan assembly, indicated generally at 16 and constituting one of the three principal components or assemblies of the present invention, the other basic parts or assemblies thereof respectively consisting of a new and novel indexing turret assembly 17 and a unique high energy package assembly consisting of a plurality of separate high energy packages. The combined turbine and rotor drive fan assembly 16 consists, in addition to the already-mentioned drive fan 20, of preferably a high temperature gas turbine wheel 19, seen in greater detail in FIG. 5, and a common and vertically-oriented, rotatable support-shaft 21 which respectively rigidly supports turbine wheel 19 and drive fan 20 in opposite relation thereon, with the turbine wheel 19 being supported to the shaft 21 near but not on an enlarged shaft top portion 21a, and the drive fan 20 attached directly to the bottom end of the shaft. Of course, to provide for the easy assembly and disassembly of the turbine-fan assembly 16, both the drive fan 20 and the enlarged shaft top portion 21a may be separately bolted or otherwise releasably attached to the shaft 21 by any of a number of well-known means.

Figure 6:
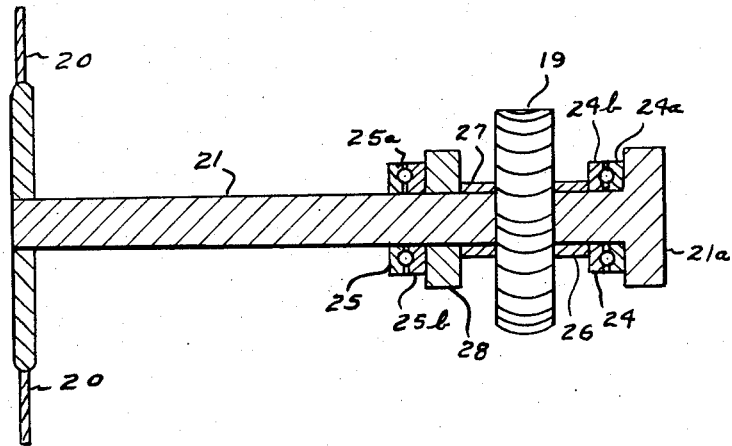
FIG. 6 represents still another relatively enlarged and elevational view, in fragmentary and sectional form, more clearly depicting details of the mounting means for the turbine-fan assembly of the invention.

The above-noted common supporting shaft 21 may be vertically supported by means of a pair of support brackets, at 22 and 23 (Note FIG. 1), in each of which a thrust bearing is shown mounted, as seen particularly at 24 and 25 in FIG. 6, and of course through which the shaft 21 extends and is thereby bearing supported. To ensure its properly-supported, vertical rotation and retention in operative position, relative to the thrust bearings 24 and 25 and, therefore, naturally with the brackets 22 and 23, the shaft 21 is specifically provided at its upper end adjacent the upper thrust bearing 24 with the previously-referred to enlarged shaft top portion 21a and at its shaft portion near the lower thrust bearing 25 with a support plate 28 preferably of approximately the same size and shape as that of the enlarged shaft top portion 21a. Support plate 28 has a tight fit on the shaft 21. With this arrangement, the said enlarged shaft top portion 21a acts generally to trap or capture the upper thrust bearing 24 and in particular presses downwardly thereagainst with a substantially tight fit against the inner race 24a thereof by virtue of its weight, which thereby automatically induces said inner race 24a to rotate with the said shaft 21. The outer race 24b thereof is fixedly supported in the top supporting bracket 22. Similarly, the outer race 25a of the lower thrust bearing 25 is fixed within the lower supporting bracket 23 and the inner race 25b thereof has a tight fit with the aforementioned support plate 28 and, because of the latter's tight fit on the shaft 21, will naturally rotate with the said shaft. A pair of sleeves 26 and 27, which provide for the correct spacing between the thrust bearings 24 and 25 and which may assist in retaining the turbine wheel 19 in its proper position, on the shaft completes this assembly. The use of the thrust bearings 24 and 25 naturally supports the axial thrust of the shaft 21 and, in addition, allows for the free spinning or easy vertical rotation thereof.

Figure 4:
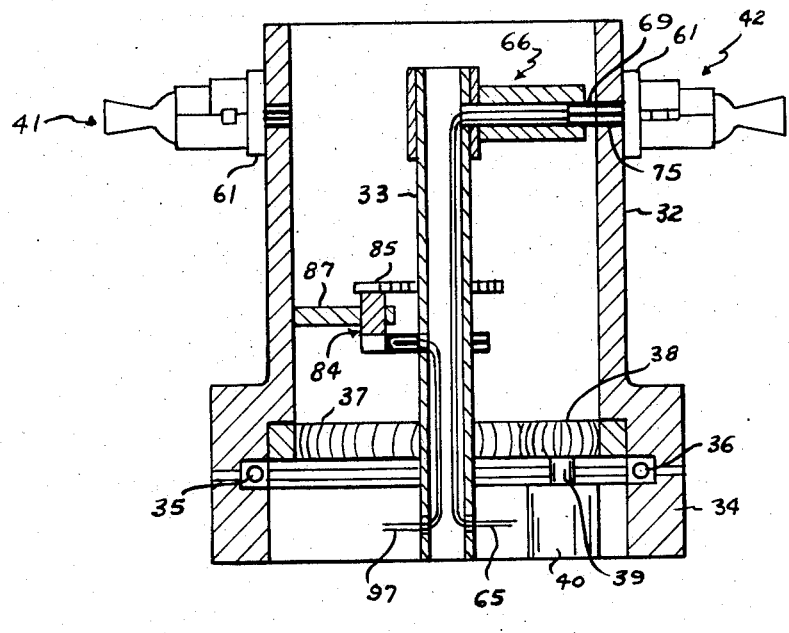
FIG. 4 is another relatively enlarged and partly schematic view, in side-elevation and sectioned, generally showing even further details of the combined high energy package, and indexing turret assembly of the invention, and, in particular, illustrating the firing mechanism used therewith.

The new and improved indexing turret assembly 17 of the instant invention consists in a geometrically and symmetrically-shaped hollow turret 32 that, as is depicted more specifically in FIG. 4, may be attached for vertical rotation on, and relative to a hollow support shaft 33 that may be, in turn, fixedly mounted in upright, vertical relation, for example, to the fuselage supporting structure 13 (FIG. 1). Moreover, the turret 32 may be bearing mounted for vertical rotation on a fixed base member 34, likewise affixed to the fuselage supporting structure 13, through means of the thrust bearings, indicated generally and somewhat schematically at 35 and 36. Again, thrust bearings 35, 36 resist axial thrust, in this instance, due to the weight of the turret 32 and, in addition, specifically allow and provide for the free running or vertical rotation thereof, relative to the base member 34, or a purpose and by particular and novel means to be further described hereinafter.

The above-mentioned vertical rotation of the turret 32 is provided by an operating means, seen clearly in FIG. 4, for example, and consisting of a first, relatively large and driven, internal spur gear 37 integrally formed on the inside diameter surface of the turret 32, a second, relatively small, drive spur gear 38 in driving mesh with said driven gear 37 and mounted on the drive shaft 39 of a small electrical, spur gear motor 40 that may be suitably mounted within the internal or inside area of the turret 32 and be under control of the aircraft pilot or other aircrew member.

Figure 3:
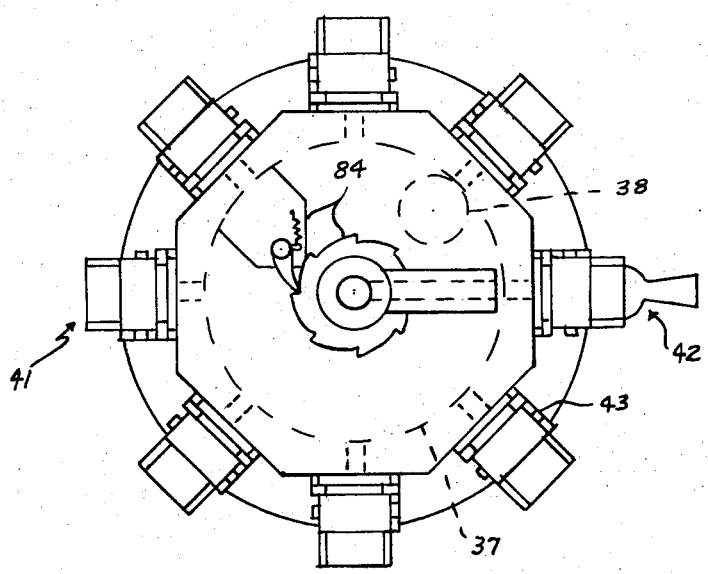
FIG. 3 is another top view, relatively enlarged and partly schematic, more clearly depicting details of the combined high energy package, and indexing turret assemblies of FIGS. 1 and 2.
Figure 8:
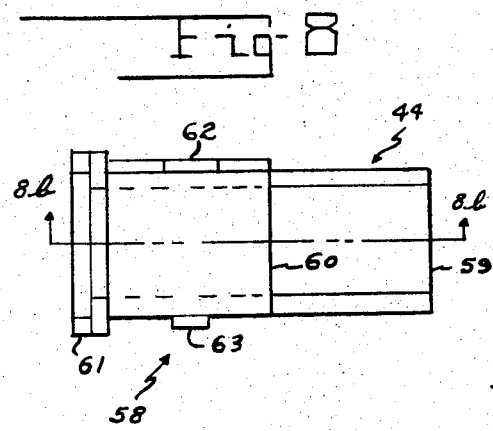
FIGS. 8 and 8a respectively represent relatively large, top and front end views of a simplified and yet uniquely-applied form of a cartridge bracket subassembly used to releasably support each of a number of novel high energy packages to the inventive indexing turret assembly.
Figure 8A:
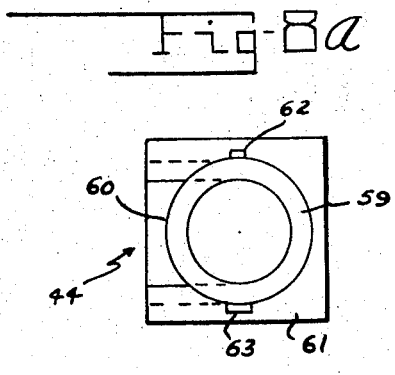
Figure 8B:
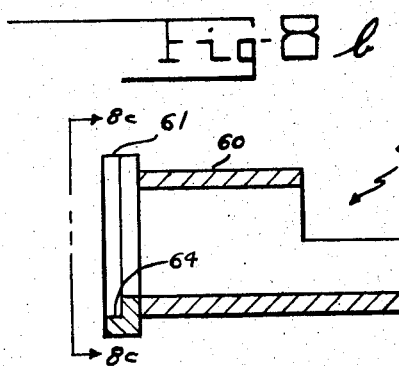
FIG. 8b is a longitudinal sectional view, taken about on line 8b—8b of FIG. 8, depicting more details of the inventive cartridge bracket assembly.
Figure 8C:
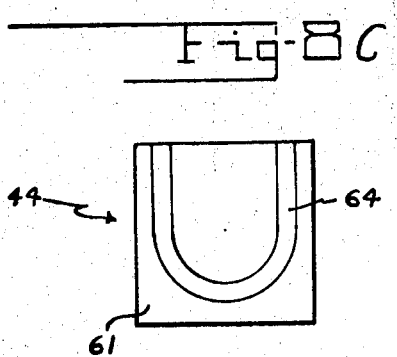
FIG. 8c is a rear end view, looking in the direction of, and about on line 8c—8c of FIG. 8b, illustrating further details of the disposition of a cartridge rim groove formed in the rear end portion of the bracket and used to positively lock a selected high energy package to the bracket.

The previously-mentioned high energy package assembly 18 (FIG. 1) of the invention actually consists, as noted hereinbefore, of a plurality of separate and individual high energy packages, two of which being indicated generally at 41 and 42 in FIGS. 3 and 4, for example, which packages may be mounted in evenly-spaced relation on and around the outside circumference of the turret 32. Each of these high energy packages, as at 41 and 42, may constitute a combined propellant and nozzle assembly that may be referred to simply as a cartridge, a representative example of which being indicated generally at 43 in FIG. 10, for example, that is releasably mounted and held in a cartridge bracket assembly, such as is indicated generally at 44 in FIG. 8, for example. Each of the aforesaid cartridges, as at 43 in the aforementioned FIG. 10, basically consists of a solid rocket propellant encased in a nozzle assembly that specifically incorporates a rocket-shaped, thin-walled metal cylinder-body or case 45 filled with the said solid rocket propellant, as is generally and schematically depicted at the reference numeral 46. Said cylinder-body or case 45 is respectively formed with a circular flanged boss element or rim 47 on its rear end, and a refractory lined-converging-diverging nozzle 48 on its opposite or front end. It is noted that the forward or front end portion solid propellant 46 has been specially designed with a cutout or recessed configuration, indicated generally at 46a, to thereby, in effect, provide a divergent wall configuration when looking towards the nozzle portion 48, so that when an igniter, indicated schematically at 49 as being positioned in the solid propellant 46 just to the rear of the inwardmost portion 46b of the cutout 46a, is fired or detonated, the products of combustion produced thereby will be specifically and positively concentrated inwardly towards the axis of the nozzle 48 and thus be given a greater impetus during the exhaustion thereof from the said nozzle.

The igniter 49 may preferably consist of an explosive squib device that forms an integral part of a primer mechanism or firing cap assembly, indicated generally and more particularly at 50 in FIG. 10b and which includes a primer or firing cap portion at 51 that forms an integral part of an overall firing mechanism and circuit to be further described hereinafter and which is under control of the aircraft pilot or other aircrew member. Said primer or firing cap portion 51 consists of an assembly or unit that includes, in alternate, nesting or concentric relation relative to each other (Note FIG. 10c), a first, outer circular insulator element 52, a circular ground conductor element 53, a second, circular inner insulator element 54, and an innermost, circular hot conductor element 55.

The firing cap assembly 50 and, in particular, its electrical circuit further includes hot and ground wires, indicated at 56 and 57, that respectively connect the explosive squib device 49 to the hot and ground conductor elements 55 and 53. The primer or firing cap portion 51 is centrally mounted, as seen in both FIGS. 10 and 10a, as a unit within the circular flanged boss element or rim 47 formed on the rear end of the cartridge 43 or, in other words, the end thereof nearest the turret 32. Firing of the squib 49 followed by the combustion of the solid rocket propellant 46 will occur by unique means to be subsequently described hereinafter.

Figure 2:
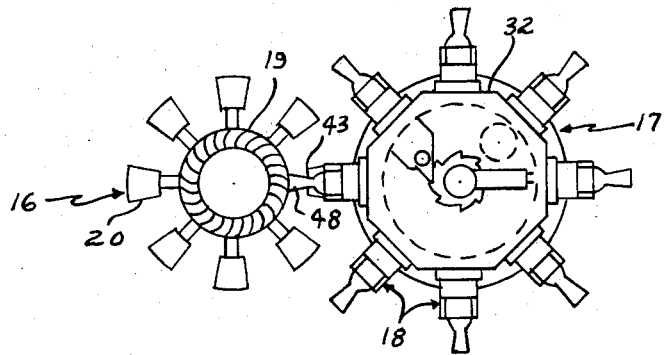
FIG. 2 is a top view of the invention, showing further details of the turbine-fan, and combined high energy package, and indexing turret assemblies thereof.
Figure 10:
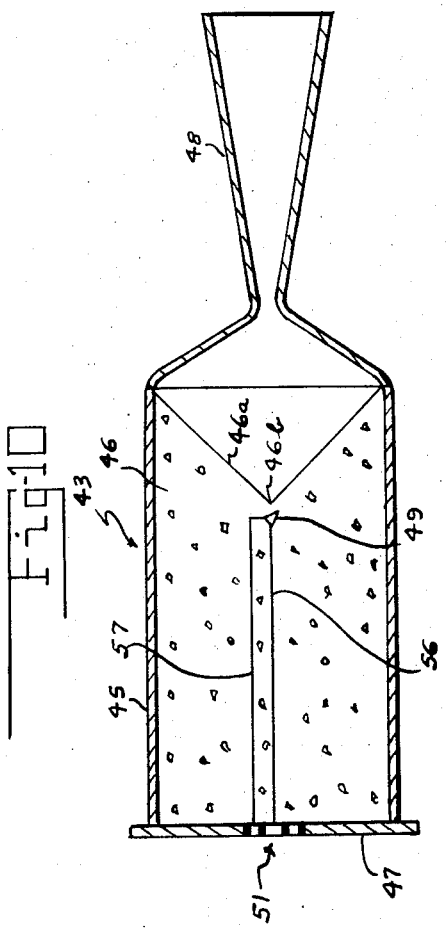
FIGS. 10 and 10a respectively represent longitudinal sectional and rear end views, showing details of the unique compact high energy package or cartridge used with, and as part of the invention.
Figure 10B:
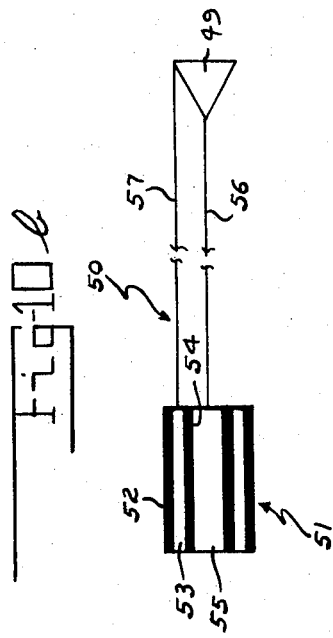
Figure 10A:
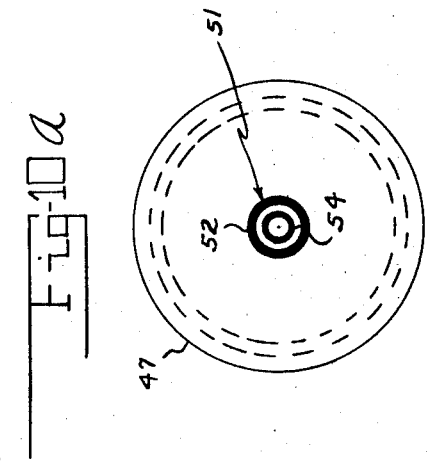
Figure 10C:
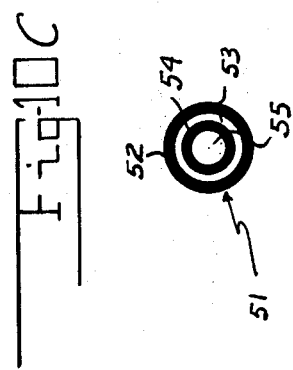

Each of the plurality of high energy packages or cartridges, as at 43 in FIG. 10, is appropriately mounted to the outside circumference of the turret 32 by means of the previously-referred to cartridge bracket, such as is illustrated generally at the aforementioned reference numeral 44 in FIGS. 8, 8a, 8b and 8c, and which consists principally of an arcuate-shaped, cartridge-receiving tray portion 59 (FIGS. 8 and 8a), a cover portion 60 and an open rear end-wall plate portion 61 mountable to the turret 32, as seen in FIG. 2, for example. The cover portion 60 may be hinged at 62 and incorporates a standard-type snap catch or spring-pressed lock, as indicated schematically at 63. Thus, with a plurality of these simplified brackets mounted in evenly-spaced relation to, and around the circumference of the turret 32, it is a relatively easy matter to quickly load a separate propellant-cartridge, as at 43, in each bracket support and, after their respective firing to rotate the turbine wheel 19 and drive fan 20 to thereby create the necessary generation of air flow into the air cushion-bag 15 (Note FIG. 1), to thereafter remove the expended cartridge and replace it with a new one. In this regard, it is contemplated that a 1-foot long propellant cartridge capable of operating between 15 –20 minutes could be used.

To ensure the positive retention of the cartridge, as at 43, within the cartridge bracket 44, the rear end of the cartridge-tray portion 59 is made with a cartridge rim-receiving groove at 64 (FIGS. 8b and 8c), into which the rim or, in other words, the circular flanged boss element 47 (FIG. 10) of the cartridge, as at 43, would snugly engage and be positively retained or locked therein by the closed cover portion 60.

When the plurality of cartridges, as at 41, 42 and/or 43, have been emplaced with their rims, as at 47 in FIG. 10, in snug-fit relation in the previously-described cartridge rim-receiving groove 64 (FIG. 8b) formed in the open rear end-wall plate 61 (FIG. 8c), the previously-described, firing cap portion, as at 51 in FIG. 10, in circuit with the squib 49 for each of the series of cartridges mounted to the turret 32, is automatically thereby positively retained against the outer wall of the said turret 32 with the left end portions of the insulators 52 and 54 (FIG. 10b) and the hot and ground conductors 55 and 53 thereof locked in position against, the right end or side portions of a similarly concentrically-arranged and identically alternately disposed set of insulators and hot and ground conductor elements of each of a series of an intermediately-disposed firing cap portion, as is indicated generally at 75 in FIG. 4, which may be uniquely mounted in, and extend through the wall of the turret 32 at the precise location of and in direct alignment with each of the series of inventive cartridges, as at 42 in the aforementioned FIG. 4, mounted on the circumference of the said turret 32. These intermediate firing cap portions 75 are constructed in a concentric arrangement of alternately-disposed, insulator and hot and ground conductor elements in a manner similar to that of the firing cap portion 51.

Figure 7:
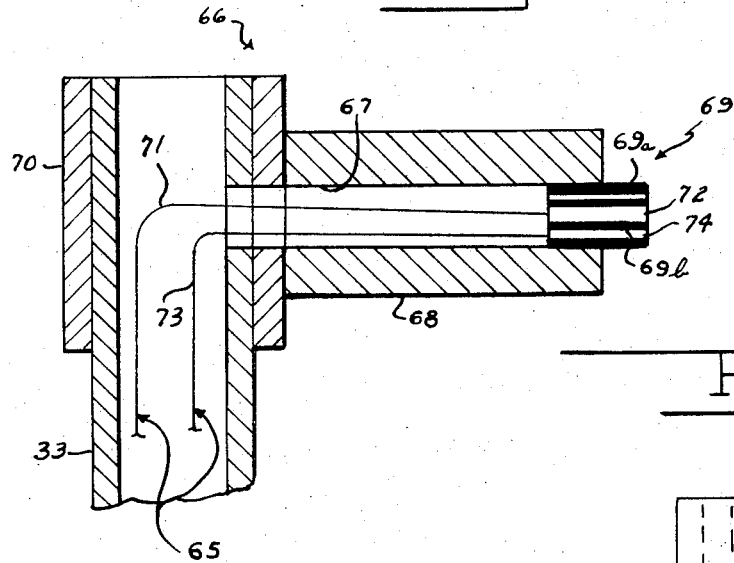
FIGS. 7 and 7a are additional relatively enlarged and fragmentary views, more clearly showing details of a novel firing mechanism used with, and as part of the invention.

With the turret 32 having been maneuvered to bring the nozzle end of a selected cartridge, as at 43 in FIG. 2, as well as the intermediately-disposed firing cap portion, as at 75, corresponding thereto and mounted in the wall of the turret 32 behind the particular cartridge, 43, into firing position relative to the turbine 19, the pilot or other aircrew member may then initiate the firing or detonation of the squib device 49 (FIG. 10) of the selected cartridge simply by engaging or pressing a conveniently located firing button (not shown) for thereby energizing the electrical circuit of a novel firing mechanism, indicated generally and schematically at 66 in both FIGS. 4 and 7, and which includes the power lines, at 65.

Figure 7A:
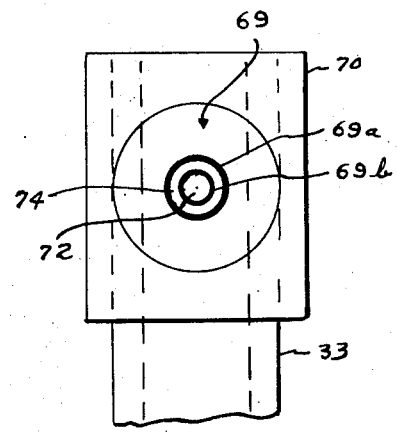

The above-noted power lines 65, may comprise hot and ground wires indicated respectively at 71 and 73 in FIG. 7 as extending upwardly through the interior of the previously-described hollow support shaft 33 and into a central, communicating and open-ended passage 67, depicted in enlarged form in FIG. 7 as extending transversely to the axis of the shaft 33, and being formed in another major element of the firing mechanism 66; namely, the firing cap mount 68 which extends at right angles and is affixed to the shaft 33 by an intervening split ring support 70. A third, firing cap portion forming an integral part of both firing mechanism 66 and the overall firing circuit for the squib 49 (FIG. 10), is indicated generally at 69 (FIG. 7). It incorporates, in a manner identical or substantially identical to that of the first-named, firing cap portion 51(FIG. 10), an alternate arrangement of insulator and conductor elements concentrically-disposed relative to each other, as is more clearly depicted in FIG. 7a, and comprises both outer and inner insulator elements, at 69a and 69b, a centrally-disposed, hot conductor element 72 to which the hot wire 71 is attached, and a ground conductor element 74 to which the ground wire 73 may be attached. As seen clearly in the aforementioned FIG. 7, firing cap portion 69 is mounted preferably in a fixed and overlapping relation within the passage 67 with a right end or side portion extending or projecting outwardly therefrom to terminate in a substantially flush relation with the inside surface of the turret 32, and in respective electrical contacting engagement with the left end or side portion of each succeeding wall-mounted, firing cap portion 75 as the latter subassemblies are respectively rotated to the firing position, along with their associated primer or firing cap portion, as at 51 (FIG. 10) for the particular cartridge, as at 43, to be fired.

With the aforementioned flush-type relation between the right end or side of firing cap portion 69 and the inside surface of the turret 32 to thereby ensure electrical contacting engagement with the appropriate end of the corresponding wall-mounted, firing cap portion 75, a complete and continuous electrical circuit from any appropriate firing mechanism-power source is assured except, of course, for the firing switch under control of the operating aircrew member. In this connection, it is noted that a continuous electrical contact may be rather easily maintained and assured between the firing cap portions 69 and 75, and 51 and 75, simply by, first, installing each wall-mounted, firing cap portion 75 with its opposite end portions extending slightly beyond a flush-type relation with the respective opposite sides of the turret wall, and providing a similar overlapping relation between the firing cap portion 51 and the rear side of the rim 47 (FIG. 10) of each of the cartridges, as at 43. Furthermore, a more positive engagement between the respective firing cap portions may, with equal facility, be ensured merely by outwardly-curving or beveling, for example, the respective conductor elements of each firing cap portion, as at 69, 75 and 51, to thereby provide a point and thus more definite and reliable contact therebetween.

Figure 7B:
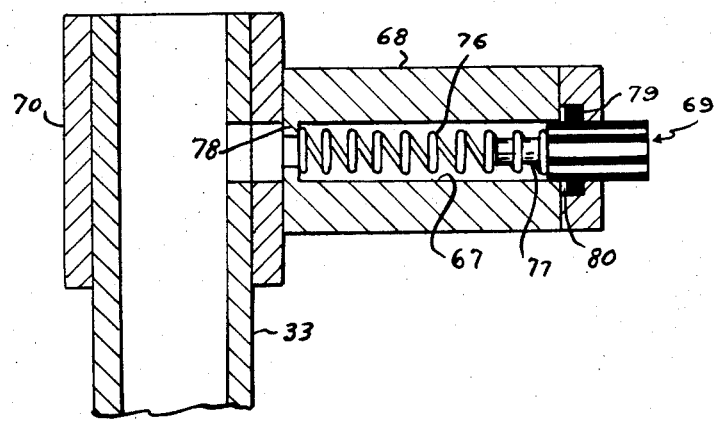
FIG. 7b is a partly broken-away, sectional and schematic view of a somewhat modified form of the firing mechanism of FIG. 7, for example.

As an alternate arrangement for ensuring that the firing cap portion 69 (FIG. 4) always contacts the wall-mounted firing cap portion 75, and, therefore, that an electrical current for detonating the explosive squib 49 (FIG. 10) is always transmitted therethrough, the firing cap portion 69, instead of being rigidly mounted in the passage 67, may be slidably mounted therewithin to a limited extent and acted upon by a relatively strong coil spring, as indicated at 76 in FIG. 7b, which coil spring 76 is mounted in the passage 67 in compressed relation between the rear end of the firing cap portion 69 and held in substantially captive relation thereto by an elongated rod-like member 77 mounted to the said cap portion-rear end, and a rear coil spring stop or ring-like element 78 incorporated on the inside surface of the firing cap mount 68 and positioned partially at or adjacent the rear end of and within the passage 67 and to which the rear end portion of the coil spring 76 may be attached.

To provide for a positive hold between the firing cap mount 68 (FIG. 7b) and the firing cap portion 69, as well as to ensure a slight relative movement thereof within the passage 67, the said firing cap portion 69 may be equipped with or otherwise incorporate an integral and circular flange-like element 79 at a convenient location on its circumference, which flange-like element 69 engages within an internal recess 80 formed in the inside diameter surface of the firing cap mount 68 adjacent the forward end thereof. This recess 80 is expressly made slightly larger in width or size than that of the flange-like element 79 affixed on the firing cap portion 69 and, in this manner, provide for the limited slidable movement of the cap portion 69 relative to the passage 67. Thus, with this arrangement, the length of the firing cap portion 69 could be so precisely dimensioned so that, when its outer or right end or side portion is in contact with the previously-noted wall mounted-firing cap portion 75, the said flange-like element 79 affixed on its circumference will be more or less centered in the internal recess 80 of the mount 68. Of course, at this time, the firing cap portion 69 will be resiliently held against the respective firing cap portion 75 by the action of the coil spring 76. In accordance with the unique teaching of the present invention, because of the relatively loose play between the firing cap-mounted flangelike element 79 and the internal recess 80, there will automatically be an inherently built-in compensation for any slight gap that might occur between the firing cap portions 69 and 75 due to normal wear-and-tear and/or any slight misalignments, for example, between the turret 32 and the shaft 33, or in any other of the invention components that might produce a gap between the firing cap portions 69 and 75.

After having detonated the explosive squib, as at 49 (FIG. 10), in the particular cartridge, as at 43 (FIG. 2), that has been adjusted to the firing position, and thereby igniting the solid propellant, as at 46, a considerable impulse is produced against, and drives the turbine 19 and fan 20 from the high energy thrust resulting from the combustion thereof to thereby cause atmospheric air to be forced through the main air inlet duct 31 into and inflating the air cushion-bag 15. Upon completion of the combustion of the solid propellant in one cartridge, as at 43, the pilot or other aircrew member may then depress a second button or operate a second switch, such as is shown schematically at 82 in the schematic indexing turret assembly-operating circuit, indicated generally at 81 in FIG. 11. This operation of the switch 82 activates the said indexing turret assembly-operating circuit from any suitable electrical power source 83 which thereby starts the operation of the previously-noted electrical spur gear motor 40 in circuit therewith. The latter action, in turn, drives or rotates the turret 32 by virtue of the previously-described meshing engagement between the small spur gear 38 mounted on the motor drive shaft 39 and the large internal spur gear 37 affixed to the inside surface of the turret 32, as depicted in FIG. 4.

The foregoing operation of the spur gear or indexing drive motor 40 will cause the turret 32 to turn or rotate about the shaft 33 until the next cartridge to be used is brought into the firing position relative to the turbine 19, as has been previously explained. At this point, a unique indexing mechanism, as is indicated generally at 84 in both FIGS. 3 and 4, becomes operative by novel means to be further explained to automatically mechanically lock the turret 32 so that the next succeeding propellant-cartridge, as at 43, is positively held in its correct firing position until the next actuation of the starter switch or button 82 (FIG. 11). Simultaneously with the aforementioned mechanical interlock of the turret in the next firing position, the aforesaid indexing mechanism 84 performs a further important function of automatically operating a circuit disconnector device or indexing lock switch, as at 85 in FIG. 11, for shutting off the power supply to, and thus stopping operation of the electrical spur gear motor 40. Of course, to turn or rotate the turret 32 again, it is only necessary to depress the button switch 82 once more.

With particular reference to FIGS. 9, 9a and 9b, the above-mentioned combined operation of the new and novel indexing mechanism 84 of the present invention will be hereinbelow described in detail. As illustrated in the aforementioned FIG. 9, the inventive indexing mechanism 84 comprises a ratchet-type of cam member 85 that is rigidly affixed to the previously-described supporting shaft 33, which also supports the turret 32, at an intermediate position therealong (FIG. 4) and which incorporates a ratchet type of periphery with the same number of stops or teeth, as at 86, as there are cartridges mounted to the turret 32. In this instance, each stop or tooth 86 is precisely spaced along the cam periphery at 45° angle from the next preceeding stop or tooth. Obviously, the actual angular distance along the periphery that each stop or tooth 86 should be located would depend on the particular design being used to employ the prest invention.

Mounted to the inside wall of the rotatably mounted turret 32 is a bracket support 87, within which bracket support 87 is rotatably mounted the vertically-disposed shaft or support post at 88. For this purpose, a bearing (not shown) may be used. As particularly illustrated in FIG. 9a, the support post 88 rotatably mounts thereto a ratchet stop member 89, which, in this instance, is shown mounted to the top of the post 88 above the bracket support 87, and a conductor strip contact member 90 disposed in spaced relation from the member 89 at a position below the bracket support 87, and with its nose portion always in contact with the periphery of a conductor disc 92 (FIG. 9b). The ratchet stop member 89 may be resiliently and constantly held, by means of a spring at 91, in contact with the periphery of the cam member 85 and in a one-way locking engagement behind a particular stop or tooth 86 representing the precise rotated position of the turret 32 to bring a selected cartridge, as at 43 (FIG. 2), into the exact firing position relative to the turbine 19. Each of the succeeding stops or teeth 86 correspond to the position of each cartridge mounted to the turret 32 as they are successively adjusted to their firing position.

When the pilot or other aircrew member elects to bring another cartridge 43 into firing position, after the solid propellant, as at 46 in FIG. 10, in one of the plurality of cartridges has been consumed, a new cartridge is adjusted into firing position by the operation of the drive means including the motor 40 for rotating the turret 32, as has been previously explained. This rotation of the turret 32, which is clockwise about the shaft 33, as viewed in FIG. 9, for example, naturally automatically carries both the ratchet stop member 89 and the conductor strip contact member 90 in the same clockwise rotation direction until the ratchet stop member 89 engages behind the next succeeding stop or tooth 86 on the periphery of the cam 85, which position of rotation brings or sets the next cartridge, as at 43, into the precise firing position, as noted hereinbefore. Simultaneously therewith the conductor strip contact member 90 becomes automatically operative as part of a unique disconnector device for shutting off the spur gear drive motor 40 and thus rotation of the turret 32 when the next succeeding cartridge has been disposed in the firing position. Said circuit disconnector device includes, in addition to the conductor strip contact member 90, the previously-referred to conductor disc 92 of a novel operation and construction composed of alternately-disposed insulating and conducting material portions, indicated generally and respectively at 93 and 94 in the aforementioned FIG. 9b. With specific reference again to FIG. 9a, it is seen that this assemblage of insulating and conductor material may be actually comprised of alternate layers of insulating material, as at 93a, 93b and 93c, interspersed with conductor strips, at 94a and 94b.

The foregoing conductor strips 94a and 94b may each be uniquely designed, in accordance with the novel teaching of the present invention, with a series of notches or recesses, as at 95 in FIG. 9b, cut out along the periphery thereof at periodic 45° intervals to thereby exactly correspond to the same 45° interval between the stops or teeth 86 of the cam member 84 (FIG. 9). With the use of the said notches or recesses 95 along the periphery of the conductor strips 94a, 94b of the conductor disc 92, the nose portion of the contact member 90 in continuous contact therewith periodically engages with the insulating portion, as at 93, of each of the insulating material-layers 93a, 93b and 93c (FIG. 9a) which have been exposed at the positions of the aforesaid notches or recesses 95 cut into the periphery of the said conductor strips. This exposure, which naturally occurs at the precise time that ratchet stop member 89 has reached and engaged the next stop or tooth 86 corresponding to the next firing cycle, becomes automatically operative to stop the drive motor 40 in the manner and because of means to be further described hereinafter. For the express purpose of acting in concert with the conductor disc 92 to disconnect or, in other words, open the electrical circuit to the turret-drive motor 40 at the appropriate time and vice versa, the conductor strip contact member 90, which, of course, always remains in contact with the periphery of the conductor disc 92 throughout the operation of the turret 32, as noted hereinabove, may be composed almost entirely of insulating material, as indicated in the area thereof generally denoted at 90a, except for the incorporation in the nose portion thereof of a relatively small conductor strip, at 96, which conductor strip 96, of course, also remains in continual contact with the periphery of the conductor disc 92.

Actually, as seen specifically in FIG. 9a, the conductor strip 96 is, in cross-section, of an arcuate or semicircular configuration with both conducting portions thereof terminating in flush relation to and forming a significant part of the nose portion of the contact member 90 in contact with the periphery of the conductor disc 92. A small insulating strip or portion at 90b is shown interposed between the two alternately-disposed conducting portions of the arcuate-shaped conductor strip 96, and, when the indexing mechanism 84 is set in the firing position of FIG. 9 by a previous rotation of the turret 32 or at the start of operation, the respective insulating and conducting portions of the contact member 90 and conductor disc 92 are exactly that illustrated in the aforesaid FIG. 9a. Of course, the power lines indicated generally at 97 as being interconnected with the conductor strips 94a and 94b are in, and form a part of the electrical circuitry of the turret-drive motor 40. In the position seen in FIG. 9a, and in the phantom line position of contact member 90 of FIG. 9b, the conductor strip contact member 90 is, in fact, shown in its conducting position, or, in other words, with the arcuate-shaped conductor strip 96 thereof in electrical contact and thereby forming a closed circuit to the motor 40 by way of the said power lines 97 which have been embedded as shown in one end or side of the conductor strips 94a and 94b. Of course, FIG. 9 represents the relative position between the cam member 84 and ratchet step member 89 for the firing position thereof.

When, however, the solid propellant in one cartridge has been expended, and the pilot or other aircrew member initiates rotation of, or again rotates the turret 32 by depressing the button switch 82 (FIG. 11) to start operation of the turretor indexing drive motor 40 from the power source 83 to thereby carry along therewith in rotation both the ratchet step member 89 and conductor strip contact member 90 (FIGS. 9 and 9a), this movement of the latter member 90 with, of course, its nose portion in contact with, and moving along the periphery of the conductor disc 92 will automatically result, immediately after the operation of the switch 82, in the conductor strip 96 formed in the said nose portion of the contact member 90 to move out of a notch or recess 95 where it was engaged with the insulating material, as at 93, to an electrically-contacting and close-circuit-producing position with the conductor strips, as at 94, of the conductor disc 92. This condition, which may be depicted by the phantom line position of the member 90 in FIG. 9b, automatically results in, and constitutes the closing of the indexing lock switch at 85 (FIG. 11) until the next recess or notch, as at 95, is reached, at which time, the nose portion and in particular the conduction strip has reached the position of the next notch or recess 95 and thereby once more engages or contacts only the insulating material portion, as at 93, of the conductor disc 92 and, in this manner, has the automatic effect of openng the indexing lock switch 85, through the interconnecting power lines 97, to thereby stop operation of the motor 40, with the turret 32 having been adjusted to bring the next cartridge in firing position. Of course, once again, the ratchet stop member 89 would be in locking engagement behind a particular stop or tooth 86 in the periphery of the cam member 85.

Although the foregoing description of the present invention has been made with specific reference to the use of an indexing turret assembly, it is to be understood that it is well within the scope of the invention, as set forth in the appended claims, to incorporate other specific means for automatically feeding and then positively holding in successive order in a firing position relative to the turbine wheel each of a number of the unique propellant-cartridges of the invention. For example, a vertical circular plate rotating about a horizontal shaft, or a breech mechanism similar to that used in cannon fire could just as easily be used to successively feed a number of cartridges of the type herein described into close proximity to, and for driving the turbine-fan assembly of the invention without departing from the true spirit or scope of the invention. Furthermore, even though an electrical type of primer mechanism is utilized in the preferred embodiment to detonate an explosive squib for firing each cartridge, it is also to be understood that a mechanical type of firing pin device could be likewise used with, and as a further modification for causing the requisite combustion of the solid rocket propellant used in each of the inventive cartridges. Finally, a centrifugal flow, or any other suitable drive fan could be used in place of the described axial flow fan.

Thus, a new, compact and lightweight air generating mechanism has been developed by the present invention whereby the required air cushion is formed beneath an aircraft during the period only when it is actually needed to support the aircraft and thus the severe penalty to useable payloads which such aircraft would suffer when relatively large, conventional drive motors, transmissions, compressors and fans are used for this purpose is negated.

I claim:

1. In an air cushion-type vehicle having air cushion-producing means suspended from, and providing the sole support to, the vehicle when traversing varied terrain, and a main, air inlet and duct in communication with the air cushion-producing means; apparatus for generating the flow of outside air through said main, air inlet and duct and into said air cushion-producing means for developing the air cushion-support for the vehicle, comprising; a rotatably mounted drive fan positioned between the air inlet duct and air cushion-producing means; a turbine interconnected for simultaneous rotation with said drive fan; a first, combined solid rocket propellant and nozzle assembly having exhaust means positionable in close proximity to, and direct alignment with said turbine; and a second, primer assembly including first, igniter means mounted in the solid rocket propellant of said first-named assembly, and second, manually-operable means interconnected with said first, igniter means and forming an integral part of said second, primer assembly, said second-named means being actuatable between a first, inoperative position and a second, operative position effective to detonate said first, igniter means to thereby fire and produce, from the combustible products thereof being discharged through the exhaust means, a driving impulse of a predetermined, substantially prolonged duration directly against the turbine to simultaneously drive it and the drive fan connected therewith, and thus provide for the said flow of vehicle-supporting air into the air cushion-producing means.

2. In an air cushion-type vehicle as in claim 1, wherein said first, igniter means comprises an explosive squib device.

3. In an air cushion-type vehicle as in claim 1, wherein said first, igniter means comprises an explosive squib device; and said second, primer assembly comprises an electrical firing circuit interconnected between said second, manually-operable means and said explosive squib device; said second, manually-operable means comprising an electrical switch under manual control of the vehicle operator.

4. In an air cushion-type vehicle as in claim 1, wherein said first, combined solid rocket propellant and nozzle assembly comprises; a plurality of separate, combined solid rocket propellant and nozzle assemblies, each having its own exhaust means; and adjustable means for mounting said plurality of separate, combined solid rocket propellant and nozzle assemblies in evenly spaced-apart relation relative thereto and adapted to bring the exhaust means of each thereof in a firing position relative to said turbine.

5. In an air cushion-type vehicle as in claim 4, and motor-drive means interconnected with, and repositioning said adjustable, mounting means in timed sequence to successively bring each of the said plurality of separate, combined solid rocket propellant and nozzle assemblies with the respective exhaust means thereof into the firing position.

6. In an air cushion-type vehicle as in claim 5, wherein said adjustable, mounting means comprises a rotatably supported turret assembly; and said motor-drive means comprises; a drive motor; a first, relatively small spur gear mounted on the motor drive shaft; and a second, relatively large spur gear fixed to said turret assembly and in meshing engagement with said first, relatively small spur gear.

7. In an air cushion-type vehicle as in claim 6, wherein said turret assembly comprises a hollow and rotatably-mounted turret simultaneously mounting said relatively large spur gear on the inside circumference thereof, and each of the said plurality of separate solid rocket propellant and nozzle assemblies in a combined propellant-cartridge-like configuration on the outside circumference thereof.

8. In an air cushion-type vehicle as in claim 7, wherein said turret assembly further comprises an indexing mechanism interconnected between said hollow turret and an electrical circuit for supplying power to the said drive motor for automatically providing and ensuring the successive adjustment of each of said plurality of separate solid rocket propellant-cartridges precisely to their firing position, simultaneously with the automatic disruption of the electrical circuit to stop the periodic operation of the drive motor when a particular solid rocket propellant-cartridge has been adjusted to the said firing position.

9. In an air cushion-type vehicle as in claim 8, wherein said indexing mechanism comprises; a first, ratchet-like cam member in fixed position relative to the turret and incorporating a series of teeth precisely corresponding to, and exactly spaced-apart at the same relative angular distances existing between the firing positions of each of the separate solid rocket propellant-cartridges; a second, ratchet stop member fixed to, and thereby automatically rotatable with said turret to selective and successive one-way locking engagements with each of the cam member-teeth, as each of the propellant-cartridges are adjusted to their firing position; a third, conductor strip contact member interconnected for simultaneous and successive rotatable movement identical with that of the turret-mounted, second, ratchet stop member to the position of each of the cam member-teeth corresponding to a selected firing position; and a fourth, conductor disc member mounted in fixed relation relative to the turret, and being in the electrical circuit of the turret-drive motor and having its periphery in continual engagement with a conducting portion of the said third, conductor strip contact member; said conductor disc member being comprised of separate insulating material-disc portions and separate conducting material-disc portions having a series of notches disposed on the peripheries thereof at precisely the same angular distances therebetween corresponding to that between the cam member-teeth for thereby periodically exposing the third, conductor strip contact member in engagement with the periphery thereof to the separate insulating material-disc portions and thus automatically disconnecting the electrical circuit of the turret-drive motor at each successive adjustment of the plurality of separate propellant-cartridges to the firing position.

10. In an air cushion-type vehicle as in claim 9, wherein each of said propellant-cartridges comprises a main, cylindrical body portion containing a predetermined supply of solid rocket propellant; a forward, rocket, exhaust nozzle end-portion; and a rear end-rim portion releasably mounted in fixed relation against the outer wall of the turret in the open-rear end portion of a cartridge-receiving tray fixed to the said turret; said tray having a cover element adjustable to a closed position over, and thereby positively retaining the said cartridge-cylindrical body portion in a releasably attached condition relative to the turret.

* * * * *